(12) United States Patent
Ishiguro

(10) Patent No.: US 9,069,486 B2
(45) Date of Patent: Jun. 30, 2015

(54) DATA TRANSFER CONTROL DEVICE AND DATA STORAGE DEVICE

(71) Applicant: KABUSHIKI KAISHA TOSHIBA, Minato-ku (JP)

(72) Inventor: Takashi Ishiguro, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/142,189

(22) Filed: Dec. 27, 2013

(65) Prior Publication Data

US 2015/0074292 A1   Mar. 12, 2015

Related U.S. Application Data

(60) Provisional application No. 61/876,583, filed on Sep. 11, 2013.

(51) Int. Cl.
*G06F 3/00* (2006.01)
*G06F 13/28* (2006.01)
*G06F 3/06* (2006.01)

(52) U.S. Cl.
CPC .............. *G06F 3/0659* (2013.01); *G06F 3/061* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,425,034 B1* | 7/2002 | Steinmetz et al. | 710/305 |
| 7,739,419 B2* | 6/2010 | Matsuda | 710/5 |
| 8,225,019 B2 | 7/2012 | Asnaashari | |
| 2004/0017772 A1* | 1/2004 | Saito et al. | 370/229 |
| 2007/0005813 A1* | 1/2007 | Juang et al. | 710/1 |
| 2008/0215789 A1* | 9/2008 | Matsuda et al. | 710/308 |
| 2009/0083021 A1 | 3/2009 | Gan et al. | |
| 2012/0166582 A1* | 6/2012 | Binder | 709/217 |

FOREIGN PATENT DOCUMENTS

JP   2008-294597   12/2008

* cited by examiner

*Primary Examiner* — Michael Sun
(74) *Attorney, Agent, or Firm* — Oblon, McClelland, Maier & Neustadt, L.L.P.

(57) ABSTRACT

According to one embodiment, a data transfer control device complying with a communication protocol which executes an update of information from an attachment device in a predetermined area of a system memory, the device includes a receiving part receiving the information from the attachment device, a transferring part transferring the information in the predetermined area, the information from the transferring part overwritten in the predetermined area sequentially, and a determining part inhibiting a transfer of the information in the transferring part to omit the update of the information in the predetermined area.

19 Claims, 10 Drawing Sheets

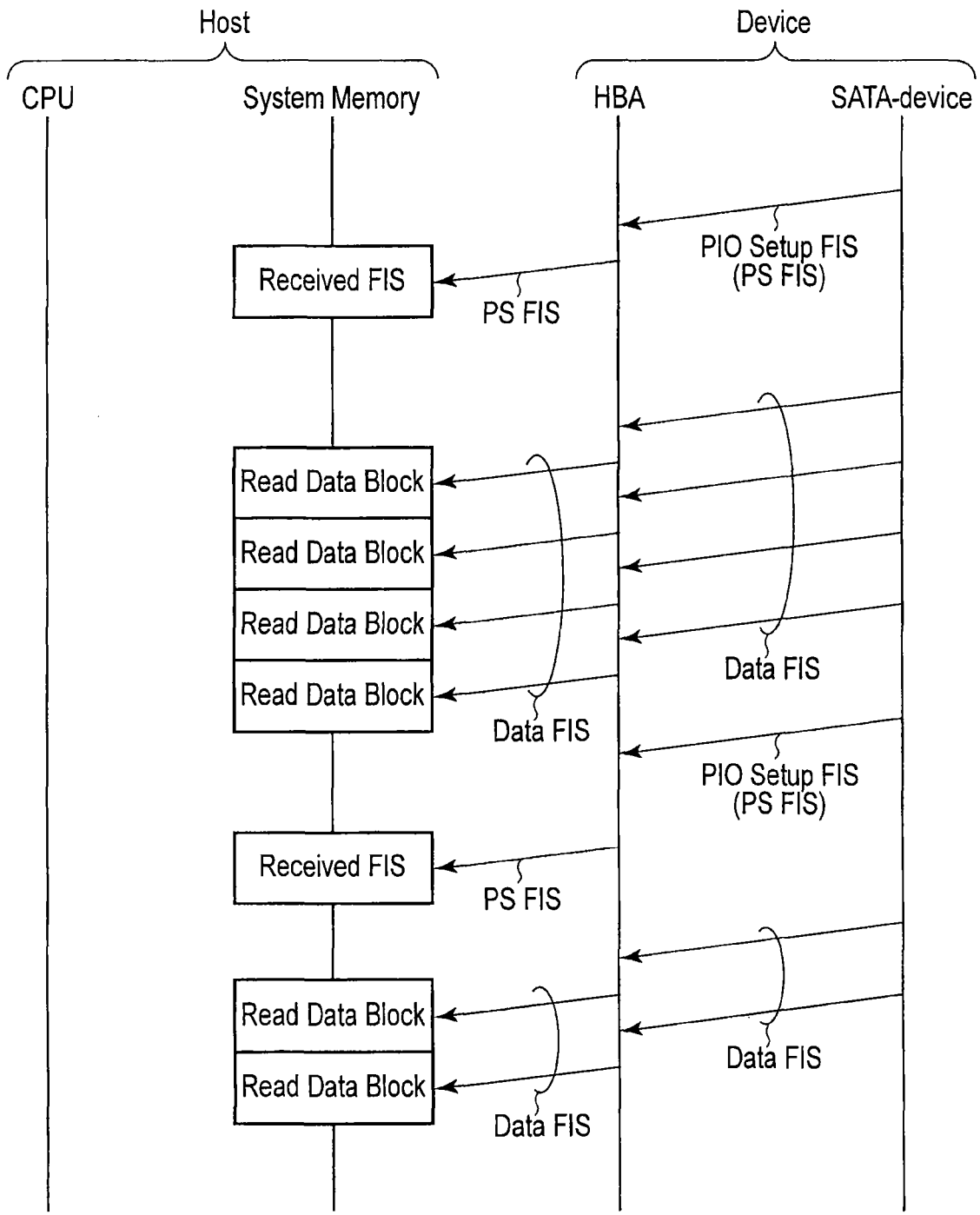
F I G. 8

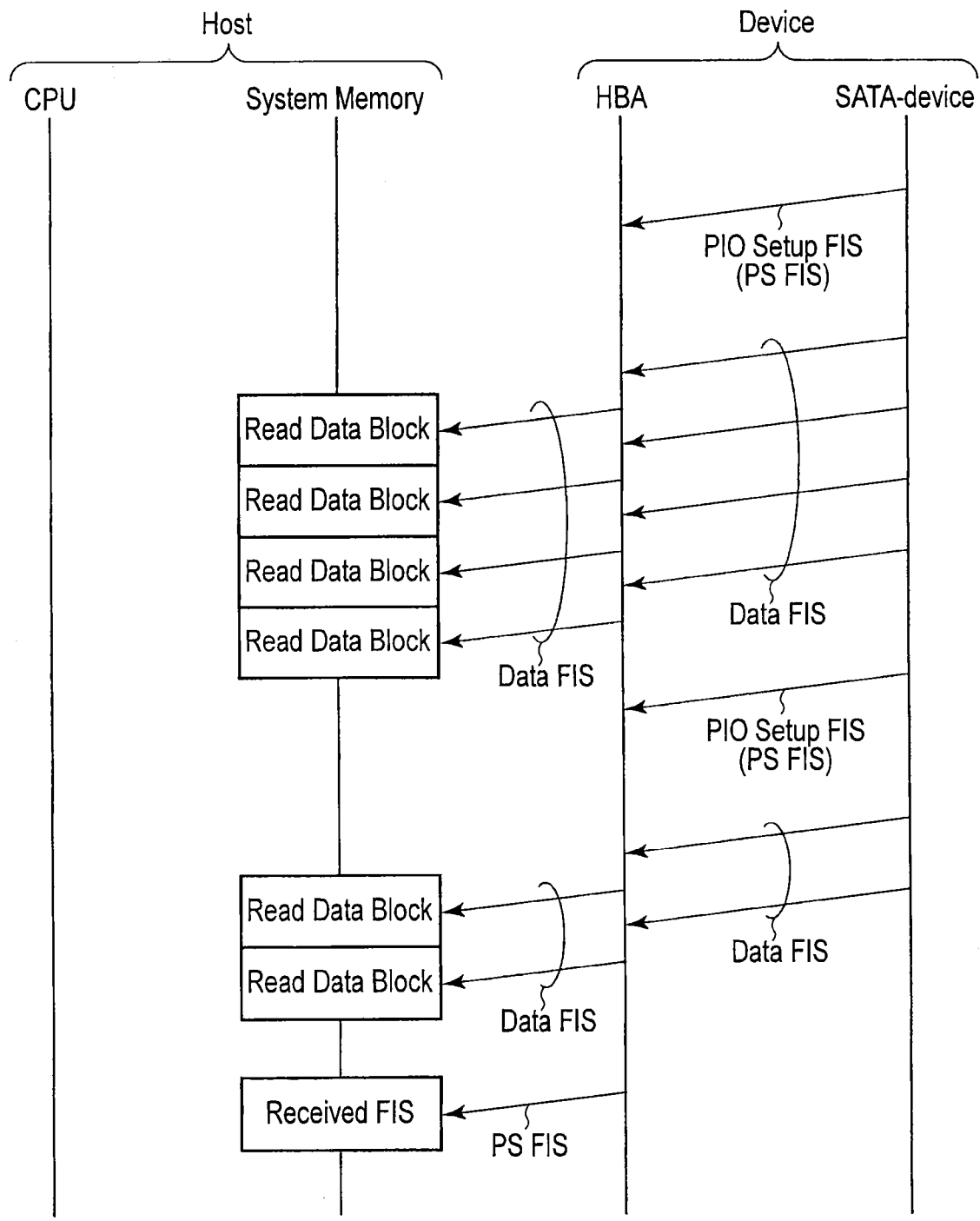
F I G. 9

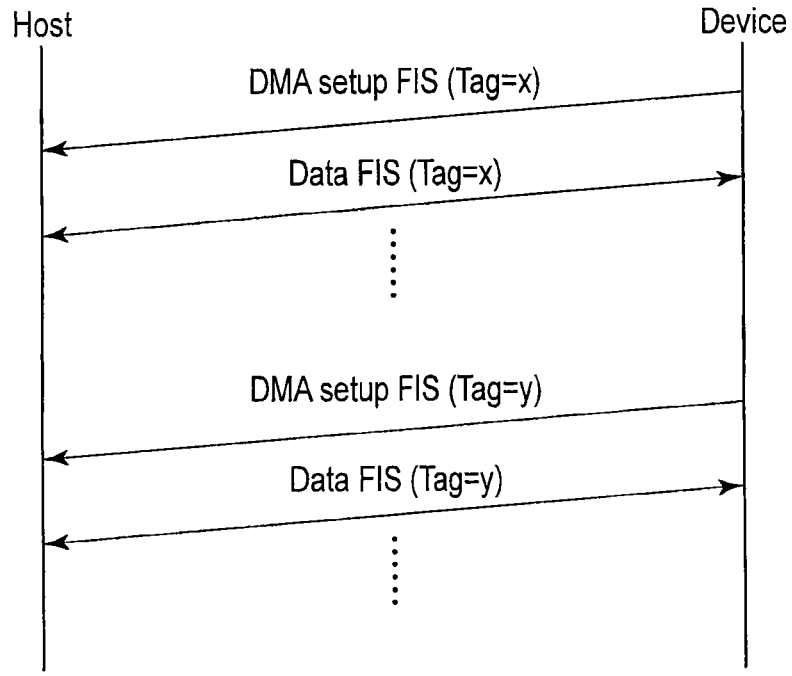
F I G. 12
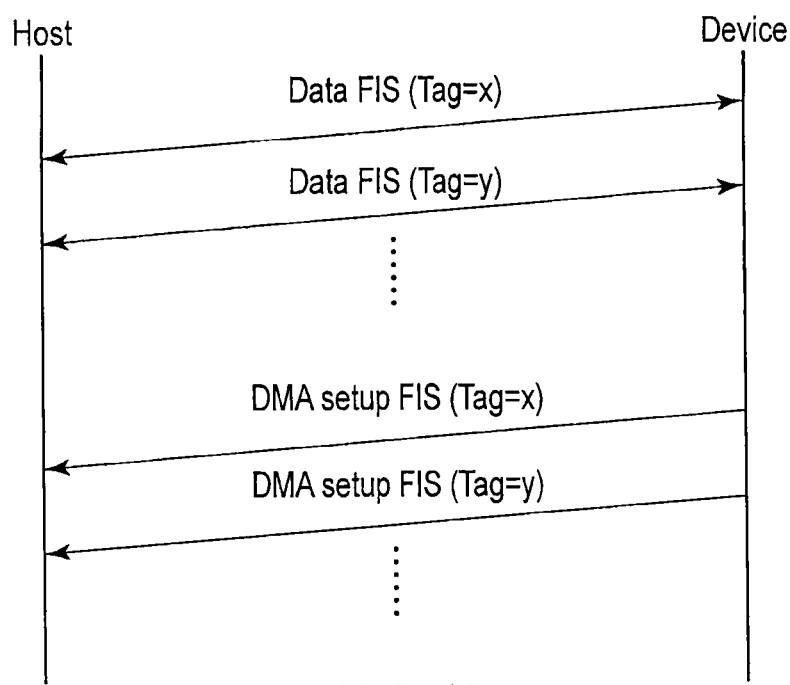
F I G. 13

DATA TRANSFER CONTROL DEVICE AND DATA STORAGE DEVICE

CROSS-REFERENCE TO RELATED APPLICATIONS

This application claims the benefit of U.S. Provisional Application No. 61/876,583, filed Sep. 11, 2013, the entire contents of which are incorporated herein by reference.

FIELD

Embodiments described herein relate generally to a data transfer control device and a data storage device.

BACKGROUND

For instance, in the Advanced Host Controller Interface (AHCI) standard, frame information structure (FIS) information items exchanged between host bus adaptor (HBA) devices are sequentially extracted in a dedicated area allocated in a host-side system memory space.

However, predetermined FIS information is stored only in one storage area even when a plurality of commands are executed based on their respective tag numbers as in native command queuing (NCQ). Namely, while a plurality of commands are being executed, the area is sequentially overwritten.

When, for example, an error has occurred or execution of all commands has been finished, a host refers to the FIS information stored in the area.

BRIEF DESCRIPTION OF THE DRAWINGS

FIG. 8 shows a PIO read data transfer flow as a comparative example;

FIG. 9 shows a PIO read data transfer flow according to a second embodiment;

FIG. 12 shows an NCQ data transfer flow as a comparative example;

FIG. 13 shows an NCQ data transfer flow according to a fourth embodiment; and

DETAILED DESCRIPTION

In general, according to one embodiment, a data transfer control device complying with a communication protocol which executes an update of information from an attachment device in a predetermined area of a system memory, the device comprising: a receiving part receiving the information from the attachment device; a transferring part transferring the information in the predetermined area, the information from the transferring part overwritten in the predetermined area sequentially; and a determining part inhibiting a transfer of the information in the transferring part to omit the update of the information in the predetermined area.

(Outline)

The embodiments described below relate to, for example, promotion of efficiency in the transfer of FIS information from a data transfer control device (device side) to a system memory (host side) under the AHCI standard.

More specifically, regarding the part (which does not need to be transferred to a system memory) of the FIS information to be exchanged between the data transfer control device (e.g., an HBA) and an attachment device (e.g., a SATA device), its transfer is omitted. The part that does not need to be transferred to the system memory is, for example, the data that is little accessed by a CPU even though it is sequentially overwritten in a predetermined area in the system memory.

As a result, the load on the data transfer control device can be reduced, and hence the bus between the host and the device can be efficiently used. Further, the processing speed of each command can be enhanced to thereby enhance the performance of the data transfer control device.

(System and Communication Protocol)

Figure 1:
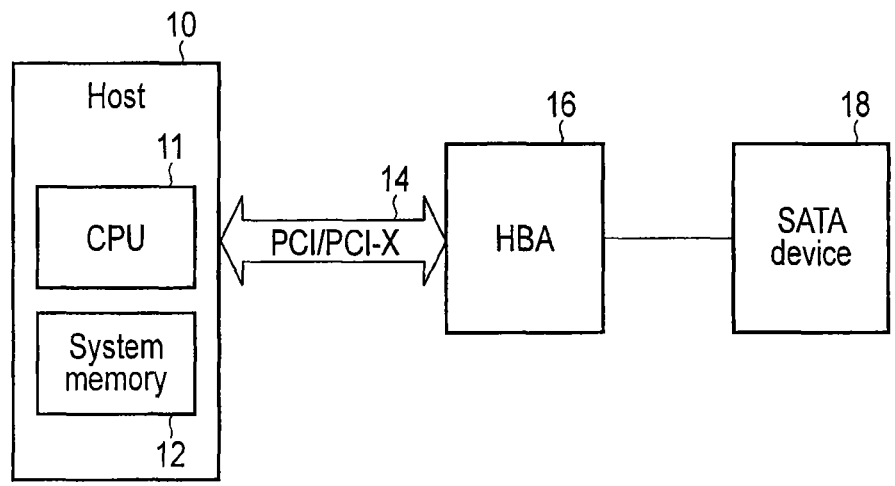
FIG. 1 is a block diagram showing a system configuration example.

FIG. 1 is a block diagram showing a system configuration example under the AHCI standard.

As shown, a host 10 is connected to a SATA device (e.g., a network device or a data storage device) 18 via an HBA 16. The host 10 is connected to the HBA 16 via a PCI/PCI-X bus 14, and the HBA 16 is connected to the SATA device 18 by SATA connection. The host 10 comprises a CPU 11 configured to control the entire system, and a system memory 12 configured to store the information necessary for the system.

Figure 2:
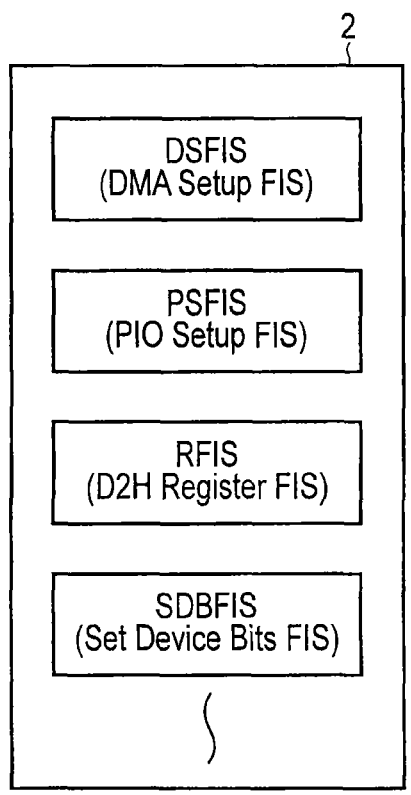
FIG. 2 shows an FIS format example.

In the system constructed as the above, FIS information exchanged between the HBA 16 and the SATA device 18 is sequentially extracted in a dedicated area allocated in the memory space of the system memory 12. FIG. 2 shows an example of the sequentially extracted data.

For instance, DSFIS (DMA Setup FIS) is the FIS information used in a direct memory access (DMA) transfer mode, and is allocated to a particular address. DSFIS is used under the NCQ protocol, under which command accumulation and data transfer are executed separately in the HBA 16.

PSFIS (PIO Setup FIS) is the FIS information used in a PIO transfer mode, and is allocated to an address different from that of DSFIS. When data transfer in the DMA transfer mode has failed, data transfer is performed via the CPU 11 using PSFIS.

RFIS (Device to Host: D2H Register FIS) is the FIS information used when the execution result of a command is reported to the CPU 11, and is allocated to an address different from those of DSFIS and PSFIS.

SDBFIS (Set Device Bits FIS) is the FIS information used when the state of the SATA device side is confirmed, and is allocated to an address different from those of DSFIS, PSFIS and RFIS. SDBFIS is used under the NCQ protocol, under which command accumulation and data transfer are executed separately in the HBA 16.

These FIS information items are sequentially overwritten in the above-mentioned predetermined area while, for example, a plurality of commands are being executed by the NCQ protocol. When, for example, an error has occurred or execution of all commands has been finished, the CPU 11 refers to the FIS information stored in the predetermined area.

Figure 3:
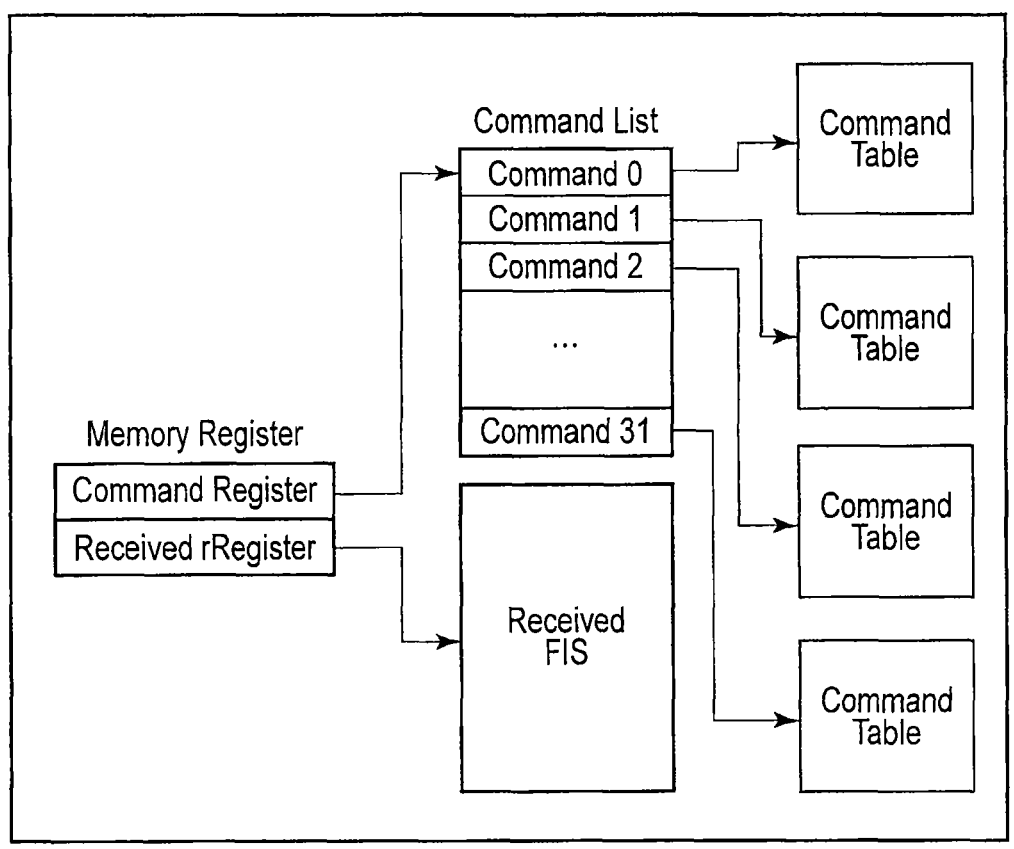
FIG. 3 shows an example of a data structure employed in the system.

The commands sent to the SATA device 18, and the storage places of the data, such as the FIS information, are managed by the memory register shown in FIG. 3.

Commands 0 to 31 shown in FIG. 3 are command lists (tags) for a plurality of queued commands.

One tag and one command table are provided for each command. In contrast, received FIS which is FIS information transferred from the HBA 16 to the system memory 12 is provided in common for a plurality of commands.

Specifically, a command table is created in the field designated by a command register included in a memory register, and a command list is also created therein. Further, received FIS is recorded in the field designated by a received register in the memory register.

Thus, while a plurality of commands are being executed by the NCQ protocol, the FIS information, such as DSFIS, PSFIS or REIS, sequentially overwritten in the predetermined area in the system memory is not referred to by the CPU 11 except for the time when an error has occurred or when all commands have been executed.

However, as long as conforming to the SATA communication protocol, the HBA 16 must transfer data (received FIS) to the system memory 12 in order to overwrite the FIS information.

In recent data storage devices, such as PCIe-SSDs, a memory controller corresponding to the HBA 16 and a memory device corresponding to the SATA device 18 are formed integral as one body, and are sold as a single package product.

In those devices, there is no particular problem even if data communication between the memory controller corresponding to the HBA 16 and the SATA device 18 does not completely conform to the SATA communication protocol. This is because the data communication between the memory controller and the memory device cannot be seen from the outside.

Further, in the case of a device having a PCIe I/F, this device functions as a master to transfer data when performing command FIS reception, received FIS transmission, and read/write data transmission/reception. Thus, the transfer timing can be controlled on the device side.

Accordingly, regarding the part (which does not need to be transferred to the system memory) of the FIS information exchanged between the memory controller (data transfer control device) corresponding to the HBA 16 and the memory device corresponding to the SATA device 18, transfer thereof can be omitted, or the order of transfer thereof can be replaced with that of data transfer. The part that does not need to be transferred to the system memory is, for example, the data that is little accessed by the CPU even though it is sequentially overwritten in a predetermined area in the system memory.

As a result, the load on the data transfer control device can be reduced, and hence the bus between the host and the device can be efficiently used. Further, the processing speed of each command can be enhanced to thereby enhance the performance of the data transfer control device.

(Embodiments)

Figure 4:
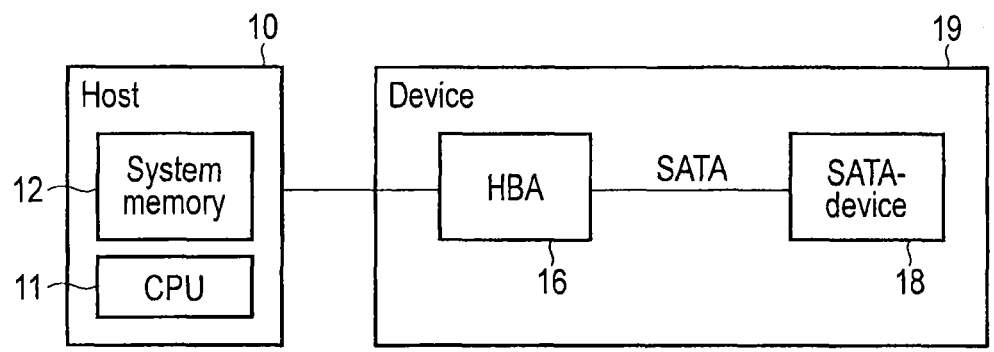
FIG. 4 is a block diagram showing a system configuration example.

FIG. 4 shows a system configuration example.

The shown system is characterized in that the HBA 16 as a data transfer control device, and the SATA device 18 as an attachment device are installed in a single package (device) 19. The host 10 comprises the CPU 11 and the system memory 12.

The embodiments described hereafter relate to a data transfer device conforming to a communication protocol for updating the information sent from the attachment device to the predetermined area of the system memory.

Figure 5:
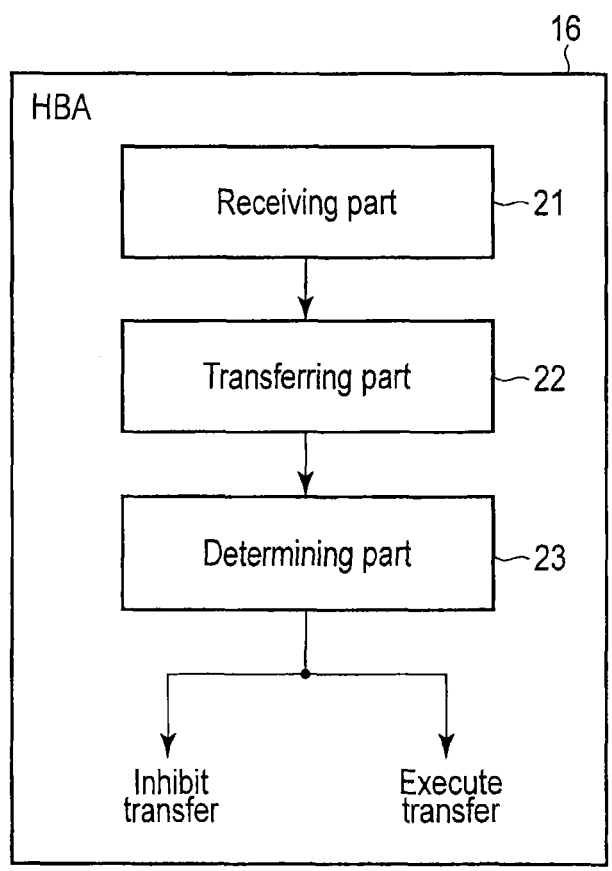
FIG. 5 is a block diagram showing the outline of a data transfer control device.

FIG. 5 shows the outline of the data transfer control device.

The HBA 16 as the data transfer control device comprises, for example, a receiving part 21 configured to receive FIS information from a SATA device as the attachment device, a transferring part 22 configured to transfer the FIS information to a predetermined area in the system memory, and a determining part 23 configured to inhibit transfer of FIS information within the transferring part 22, and omit updating of the FIS information in the predetermined area of the system memory.

Namely, the determining part 23 permits transfer of FIS information to the system memory if a predetermined condition is satisfied, and inhibits transfer of the FIS information if the condition is not satisfied. The FIS information transferred from the transferring part 22 to the system memory is sequentially overwritten in the predetermined area of the system memory.

Alternatively, the function of the determining part 23 shown in FIG. 5 may be imparted to the SATA device 18 shown in FIG. 4, thereby omitting transfer of FIS information between the HBA 16 and the SATA device 18. In the embodiments below, a description will be given of the case where the determining part 23 shown in FIG. 5 is included in the HBA side.

(1) First Embodiment

Figure 6:
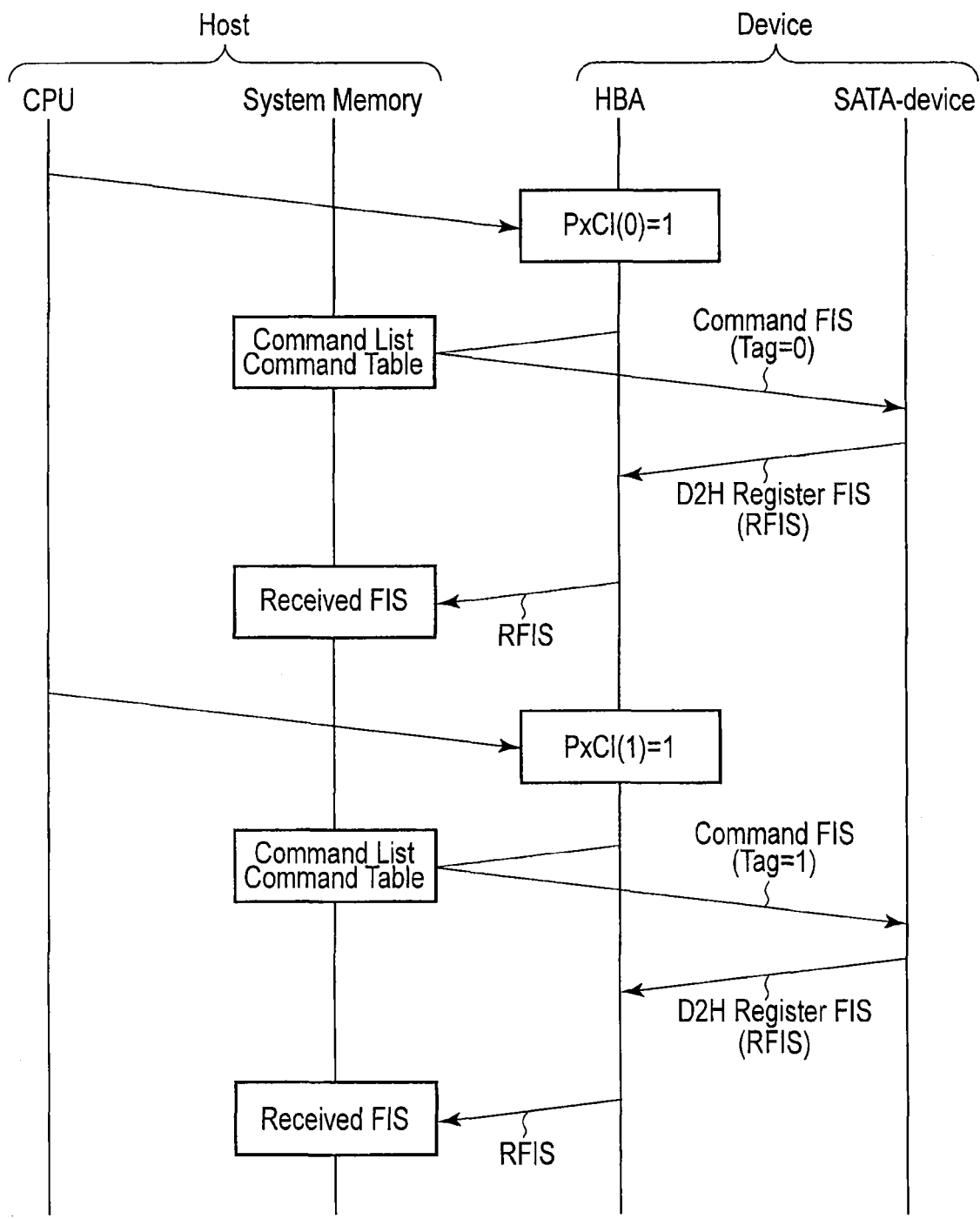
FIG. 6 shows a command issue flow as a comparative example.
Figure 7:
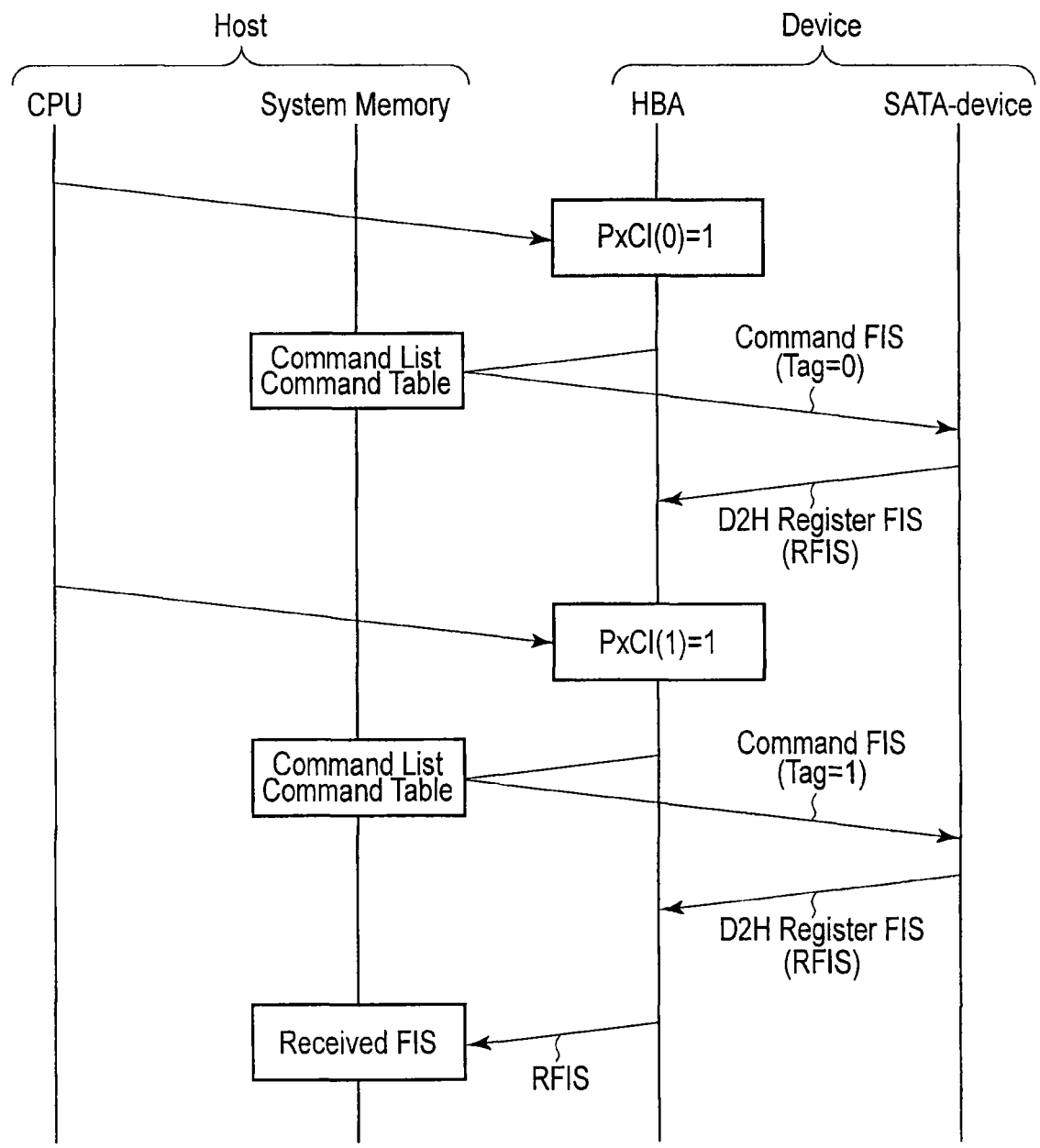
FIG. 7 shows a command issue flow in NCQ according to a first embodiment.

FIG. 6 shows an NCQ command issue flow as a comparative example for the first embodiment. FIG. 7 shows an NCQ command issue flow according to the first embodiment.

The first embodiment is characterized in that when an NCQ command is issued, transfer of a part of D2H Register FIS (RFIS) exchanged between the HBA (data transfer control device) and the SATA device is omitted.

For instance, in the NCQ command issue flow as a comparative example, firstly, data "PxCI(0)=1" indicating that a first command (a command list and a command table) has been registered in the system memory is sent from the CPU to the HBA, as is shown in FIG. 6. The HBA reads the first command from, for example, the field of the system memory designated by the command register shown in FIG. 3, and transfers the first command as Command FIS (Tag=0) to the SATA device.

Based on the received Command FIS, the SATA device queues the first command, and reports, as RFIS to the HBA, an acceptance response to the first command. The HBA copies, as received FIS, the RFIS from the SATA device, in the field of the system memory designated by the received register of FIG. 3.

Subsequently, data "PxCI(1)=1" indicating that a second command (a command list and a command table) has been registered in the system memory is sent from the CPU to the HBA. The HBA reads the second command from, for example, the field of the system memory designated by the command register shown in FIG. 3, and transfers the second command as Command FIS (Tag=1) to the SATA device.

Based on the received Command FIS, the SATA device queues the second command, and reports, as RFIS to the HBA, an acceptance response to the second command. The HBA copies, as received FIS, the RFIS from the SATA device, in the field of the system memory designated by the received register of FIG. 3.

In the system memory, the received FIS as the acceptance response to the first command is overwritten with the received FIS as the acceptance response to the second command.

Thus, if it is assumed that there is little error occurrence (i.e., the CPU little requires received FIS) when executing a plurality of commands in accordance with the tag numbers (executing the commands in the order of, for example, first, second, third, . . . , commands) as in NCQ, it is sufficient if transfer of the same type received FIS to the system memory is performed after all commands have been accepted.

In other words, the transfer from the HBA to the system memory of received FIS other than the received FIS as the acceptance response to the final command can be omitted.

For instance, as shown in FIG. 7, in the NCQ command issue flow of the first embodiment, data "PxCI(0)=1" indicating that a first command (a command list and a command table) has been registered in the system memory is sent from the CPU to the HBA. The HBA reads the first command from the field of the system memory designated by the command register shown in FIG. 3, and transfers the first command as Command FIS (Tag=0) to the SATA device.

Based on the Command FIS, the SATA device queues the first command, and reports, as RFIS to the HBA, an acceptance response to the first command. However, if the first command is not a final command, the HBA does not transfer, to the system memory, the RFIS (received FIS) received from the SATA device.

After that, data "PxCI(1)=1" indicating that a second command (a command list and a command table) has been registered in the system memory is sent from the CPU to the HBA. The HBA reads the second command from, for example, the field of the system memory designated by the command register shown in FIG. 3, and transfers the second command as Command FIS (Tag=1) to the SATA device.

Based on the received Command FIS, the SATA device queues the second command, and reports, as RFIS to the HBA, an acceptance response to the second command. If the second command is the final one, the HBA copies, as received FIS, the RFIS (received FIS) from the SATA device, in the field of the system memory designated by, for example, the received register of FIG. 3.

As described above, reduction of the load on the HBA, efficient use of the bus between the host and the device, and enhancement of performance due to enhancement of the processing speed of each command, can be realized by omitting the transfer, from the HBA to the system memory, of received FIS other than that as an acceptance response to the final command.

In the first embodiment, it is determined whether the command is the final one, based on whether the period ranging from the reception of RFIS from the SATA device to the reception, from the CPU, of the data (PxCI(i)=1) indicating registration of a new command is equal to or longer than a predetermined period.

Alternatively, it can be determined whether the command is the final one, based on whether all command slots corresponding to the registered commands are empty.

Further, when an error (e.g., an operation stop) has occurred before the execution of the final command is completed, it is sufficient if command RFIS to be transferred immediately before the execution of a command associated with the error is transferred as received FIS to the system memory.

As described above, when an error has occurred, the CPU can deal with the error by referring to the received FIS in the system memory. However, the HBA needs to store old RFIS until it receives new RFIS.

(2) Second Embodiment

FIG. 8 shows a PIO read data transfer flow as a comparative example of a second embodiment. FIG. 9 shows a PIO read data transfer according to the second embodiment.

The second embodiment is characterized in that when reading data from the SATA device in the PIO transfer mode, the HBA (data transfer control device) omits transfer, to the system memory, of a part of the PIO setup FIS (PSFIS) exchanged between the HBA and the SATA device.

For instance, in the conventional PIO read data transfer flow shown in FIG. 8, firstly, PSFIS indicating that first data transfer (transmission) in the PIO transfer mode is now ready is transferred from the SATA device to the HBA.

The PSFIS includes information indicating the size of the data transferred from the SATA device to the HBA in the first data transfer. Further, the HBA copies the PSFIS, received from the SATA device, as received FIS in, for example, the field of the system memory designated by the received register of FIG. 3.

Subsequently, the SATA device transfers read data as data FIS to the HBA. The HBA, in turn, records the received data FIS in a read data block in the system memory.

Thereafter, the SATA device transfers, to the HBA, PSFIS indicating that second data transfer (transmission) in the PIO transfer mode is now ready. The PSFIS includes information indicating the size of the data transferred from the SATA device to the HBA in the second data transfer. Further, the HBA copies the PSFIS, received from the SATA device, as received FIS in, for example, the field of the system memory designated by the received register of FIG. 3.

After that, the SATA device transfers read data as data FIS to the HBA. The HBA records the data FIS in a read data block in the system memory.

In the system memory, the received FIS indicating that the first data transfer (transmission) is now ready is overwritten with the received FIS indicating that the second data transfer (transmission) is now ready.

Therefore, assuming that there is little occurrence of errors (in which the CPU requires received FIS), it is sufficient if received FIS of the same type is transferred to the system memory after all data transfers are finished.

In other words, transfer of received FIS from the HBA to the system memory can be omitted except for the received FIS indicating that final data transfer is now ready.

For instance, in the PIO read data transfer flow of the second embodiment shown in FIG. 9, PSFIS indicating that the first data transfer (transmission) in the PIO transfer mode is now ready is transferred from the SATA device to the HBA. However, if the first data transfer is not the final data transfer, the HBA does not transfer, to the system memory, the PSFIS from the SATA device as received FIS.

After that, the SATA device transfers read data as data FIS to the HBA. The HBA records the data FIS in a read data block in the system memory.

Subsequently, the SATA device transfers, to the HBA, PSFIS indicating that second data transfer (transmission) in the PIO transfer mode is now ready. If the second data transfer is the final data transfer, the HBA copies the PSFIS from the SATA device as received FIS in the field in the system memory designated by the received register of FIG. 3.

Further, the SATA device transfers read data as data FIS to the HBA. The HBA records the data FIS in a read data block in the system memory.

In the second data transfer (as the final data transfer), transfer of PSFIS from the HBA to the system memory may be performed after all data transfers to the system memory are completed, or immediately after the HBA receives PSFIS from the SATA device, as is shown in FIG. 9.

If PSFIS is transferred from the HBA to the system memory after all data transfers have been completed, data transfer to the system memory can be performed subsequent to the PSFIS transfer, which can further reduces the load on the HBA.

By thus omitting the transfer, from the HBA to the system memory, of the received FIS other than that associated with the final data transfer, reduction of the load on the HBA, efficient use of the bus between the host and the device, and enhancement of the performance of the entire system due to enhancement in the processing speed of each command, can be realized.

In the above-described second embodiment, it can be determined whether the current data transfer is the final one, based on whether the period ranging from the reception of current PSFIS from the SATA device to the reception of subsequent PSFIS from the SATA device is equal to or longer than a predetermined period.

It can also be determined whether the current data transfer is the final one, based on whether the required transfer data size of each command is equal to the size of the data actually transferred so far.

Further, if an error (e.g., an operation stop) has occurred before the completion of the final data transfer, it is sufficient if PSFIS corresponding to a data transfer associated with the error is transferred as received FIS to the system memory upon the occurrence of the error. Thus, even when an error has occurred, the CPU can deal with the error by referring to the received FIS in the system memory.

(3) Third Embodiment

Figure 10:
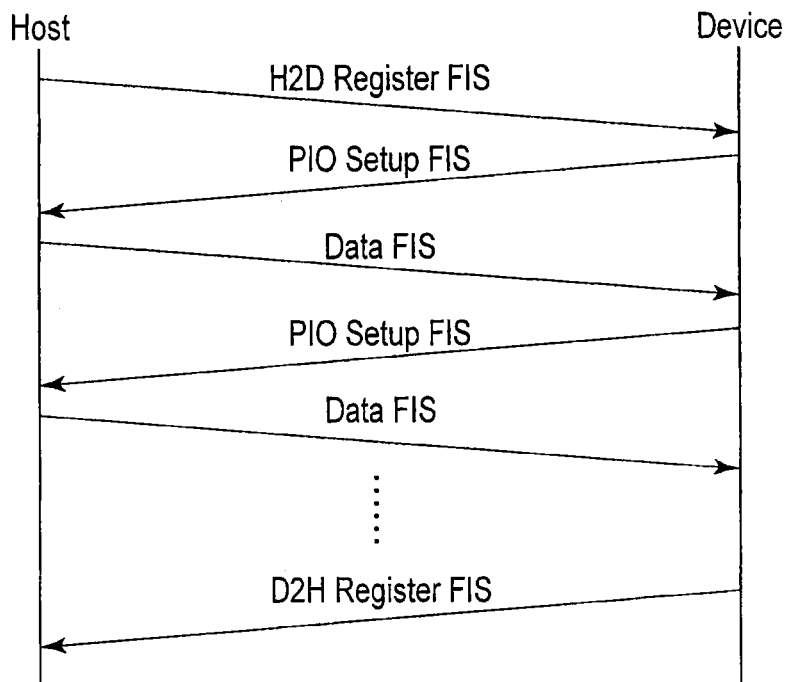
FIG. 10 shows a PIO write data transfer flow as a comparative example.
Figure 11:
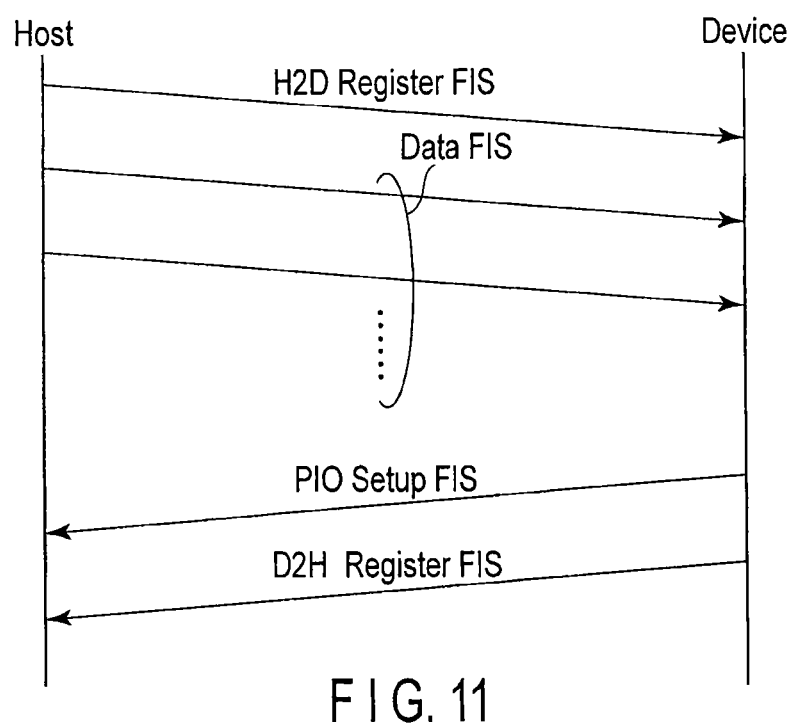
FIG. 11 shows a PIO write data transfer flow according to a third embodiment.

FIG. 10 shows a PIO write data transfer flow as a comparative example of a third embodiment. FIG. 11 shows a PIO write data transfer flow according to the third embodiment.

The third embodiment is characterized in that transfer, from the HBA (device) to the system memory (host), of a part of the PIO setup FIS exchanged between the HBA and the SATA device is omitted during writing data to the SATA device in the PIO transfer mode.

For instance, in the conventional PIO write data transfer flow shown in FIG. 10, firstly, H2D (Host to Device) register FIS is transferred from the host to the device as command FIS indicating a data transfer (data write) in the PIO transfer mode.

Upon receiving the H2D register FIS, the device transfers, to the host, PIO setup FIS indicating that a first data transfer (reception) in the PIO transfer mode is now ready. After that, the host transfers write data as data FIS to the device.

Subsequently, the device transfers, to the host, PIO setup FIS indicating that second data transfer (reception) in the PIO transfer mode is now ready. After that, the host transfers write data as data FIS to the device.

The above-described transfers of PIO setup FIS and data FIS are alternately performed.

After all data transfers (receptions) are completed, the device transfers, to the host, D2H (Device to Host) register FIS indicating a command execution result.

The PIO setup FIS (received FIS) is sequentially overwritten in a predetermined area in the system memory.

As described above, assuming that there is little occurrence of errors (in which the CPU requires received FIS), it is sufficient if received FIS of the same type is transferred to the system memory after all data transfers (receptions) are finished.

In other words, transfer of received FIS from the HBA to the system memory can be omitted except for the PIO setup FIS indicating that the final data transfer is now ready, and the D2H (Device to Host) register FIS indicating a command execution result.

For instance, in the PIO write data transfer flow of the third embodiment shown in FIG. 11, firstly, the host transfers H2D register FIS to the device as command FIS indicating a data transfer (data write) in the PIO transfer mode. After that, the host continuously transfers write data as data FIS to the device.

After all data transfers (receptions) are completed, the device transfers PIO setup FIS and D2H register FIS to the host.

In the third embodiment, D2H register FIS is transferred after the transfer of PIO setup FIS. Alternatively, however, PIO setup FIS may be transferred after the transfer of D2H register FIS.

By thus omitting the transfer, from the HBA (device) to the system memory (host), of the received FIS other than that associated with the final data transfer, reduction of the load on the HBA, efficient use of the bus between the host and the device, and enhancement of the performance of the entire system due to enhancement in the processing speed of each command, can be realized.

In the above-described third embodiment, it can be determined whether the current data transfer is the final one, based on whether the period ranging from the reception of current PSFIS from the SATA device to the reception of subsequent PSFIS from the SATA device is equal to or longer than a predetermined period.

It can also be determined whether the current data transfer is the final one, based on whether the required transfer data size of each command is equal to the size of the data actually transferred so far.

Further, if an error (e.g., an operation stop) has occurred before the completion of the final data transfer, it is sufficient if PSFIS corresponding to a data transfer associated with the error is transferred as received FIS to the system memory upon the occurrence of the error. Thus, even when an error has occurred, the CPU can deal with the error by referring to the received FIS in the system memory.

(4) Fourth Embodiment

FIG. 12 shows an NCQ data transfer flow as a comparative example of a fourth embodiment. FIG. 13 shows an NCQ data transfer flow according to the fourth embodiment.

The fourth embodiment is characterized in that during NCQ reading/writing, DMA setup FIS is transferred from the HBA (device) to the system memory (host) after all read/write operations are completed.

For instance, in the conventional NCQ data transfer flow shown in FIG. 12, firstly, command queuing is performed in accordance with such a command queuing flow as described in the first embodiment.

In response to the command queuing, DMA setup FIS (Tag=x) indicating that a first read/write operation is now ready is transferred from the device to the host.

After that, write data or read data is continuously transferred as data FIS (Tag=x) between the device and the host.

Subsequently, DMA setup FIS (Tag=y) indicating that a second read/write operation is now ready is transferred from the device to the host. After that, write data or read data is continuously transferred as data FIS (Tag=y) between the device and the host.

The above-described transfers of DMA setup FIS and data FIS are alternately performed.

After all data transfers are completed, the device transfers, to the host, SDBFIS (Set Device Bits FIS) (not shown) indicating the tags corresponding to the executed commands.

The DMA setup FIS (received FIS) is sequentially overwritten in a predetermined area in the system memory for each tag (Tag=x, y, . . . ).

Therefore, assuming that there is little occurrence of errors (in which the CPU requires received FIS), it is sufficient if received FIS of the same type is transferred to the system memory after all data transfers are finished.

For instance, in the NCQ data transfer flow of the fourth embodiment, firstly, command queuing is performed in accordance with the flow as described in the first embodiment, as shown in FIG. 13.

After that, write data or read data is continuously transferred as data FIS (Tag=x) between the device and the host. Subsequently, write data or read data is continuously transferred as data FIS (Tag=y) between the device and the host.

After all data transfers are completed, the device transfers, to the host, DMA setup FIS (Tag=x) and DMA setup FIS (Tag=y). Alternatively, transfer of DMA setup FIS (Tag=x) may be omitted, and only DMA setup FIS (Tag=y) corresponding to the finally transferred data FIS (Tag=y) be transferred. Further, the device transfers, to the host, SDBFIS (Set Device Bits FIS) indicating the tag of the execution completed command (not shown).

As described above, after all read/write operations are completed, DMA setup FIS is transferred from the HBA (device) to the system memory (host). As a result, reduction of the load on the HBA, efficient use of the bus between the host and the device, and enhancement of the performance of the entire system due to enhancement in the processing speed of each command, can be realized.

In the above-described fourth embodiment, it can be determined whether all read/write operations are completed, based on whether the period ranging from the reception of current DMA setup FIS by the HBA (device) from the SATA device to the reception of subsequent DMA setup FIS from the SATA device is equal to or longer than a predetermined period.

It can also be determined whether all read/write operations have been completed, based on whether the required transfer data size of all queued commands is equal to the data size of the actually transferred command data.

Further, if an error (e.g., an operation stop) has occurred before the completion of all read/write operations, it is sufficient if DMA setup FIS corresponding to the data transfer associated with the error is transferred as received FIS to the system memory upon the occurrence of the error. Thus, even when an error has occurred, the CPU can deal with it by referring to the received FIS in the system memory.

(Application Example)

The above-described embodiments are applicable to, for example, a transfer protocol between a host and an HBA in the AHCI standard. Further, the embodiments are effectively applicable to a storage device, such as an SSD or a memory card, which installs an HBA (or controller) and a SATA device (or memory device) in one package.

Figure 14:
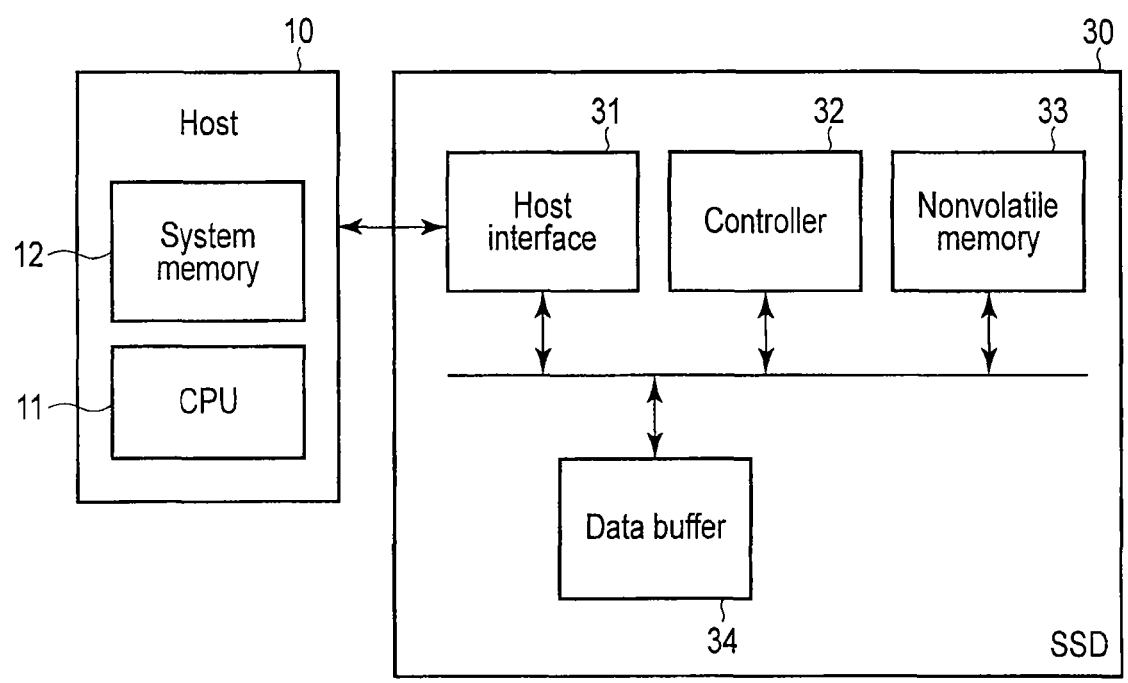
FIG. 14 is a block diagram showing an SSD as an application example.

FIG. 14 shows the configuration of an SSD 30 as an applied example.

The SSD 30 comprises a host interface 31, a controller 32, a nonvolatile memory 33 and a data buffer 34. The host interface 31 functions as an interface between the host 10 and the SSD 30. The host 10 comprises a CPU 11 and a system memory 12.

The nonvolatile memory 33 is, for example, a NAND flash memory. The data buffer 34 is, for example, a DRAM or an MRAM (Magnetic Random Access Memory). Namely, it is sufficient if the data buffer 34 is a random access memory faster in operation than the nonvolatile memory 33 as a storage memory.

The controller 32 controls reading and writing of data from and to the nonvolatile memory 33, and also erasure of data from the same. For instance, when the nonvolatile memory 33 is a NAND flash memory, the size of the data exchanged between the host 10 and the host interface 31 differs from the size of the data read, written and erased in the NAND flash memory.

To overcome the disadvantages (reduction of read/write speed or occurrence of a bad block) resulting from this difference, the controller 32 controls data reading, writing and erasing with respect to the nonvolatile memory 33.

(Conclusion)

The above-described embodiments can enhance the performance of the system by omitting part of transfer of FIS information during command queuing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data transfer control device complying with a communication protocol which executes an update of information from an attachment device in a predetermined area of a system memory, the device comprising:
   a receiving part receiving the information from the attachment device;
   a transferring part transferring the information in the predetermined area, the information from the transferring part overwritten in the predetermined area sequentially; and
   a determining part inhibiting a transfer of the information in the transferring part to omit the update of the information in the predetermined area,
   wherein the information is a frame information structure (FIS)-information as a response of a selected command among registered commands, and
   the determining part allows transferring the information to the system memory when the selected command is a final command, and inhibits transferring the information to the system memory when the selected command is a command except the final command.

2. The data transfer control device of claim 1,
   wherein the determining part determines the selected command to be the final command, when a new command is not entered during a predetermined term from a point in which the FIS-information as the response of the selected command is received by the receiving part.

3. The data transfer control device of claim 1,
   wherein the determining part determines the selected command to be the final command, when command slots corresponding to the registered commands are all empty in a point in which the FIS-information as the response of the selected command is received by the receiving part.

4. The data transfer control device of claim 1,
   wherein the FIS-information of a command executed right before a command according to an error is transferred in the predetermined area of the system memory, when the error generates before a completion of the final command.

5. The data transfer control device of claim 1,
   wherein the information is a frame information structure (FIS)-information showing a preparation of a data receiving to the attachment device, and the determining part allows transferring the information to the system memory, when the data receiving is a final data receiving.

6. The data transfer control device of claim 5, wherein the transferring the information to the system memory is executed after a completion of all data receiving to the attachment device.

7. The data transfer control device of claim 5, wherein the determining part determines the data receiving to be the final data receiving, when a new FIS-information is not received by the receiving part during a predetermined term from a point in which the FIS-information is received by the receiving part.

8. The data transfer control device of claim 5, wherein the FIS-information of a data receiving according to an error is transferred in the predetermined area of the system memory, when the error generates before a completion of the final data receiving.

9. The data transfer control device of claim 1, wherein the data transfer control device is a host bus adapter, and the host bus adapter and the attachment device are mounted in a package.

10. The data transfer control device of claim 1, wherein the communication protocol executes queuing commands and transferring data independently, and the predetermined area is determined based on a kind of the commands.

11. The data transfer control device of claim 1, wherein the communication protocol complies with an advanced host controller interface (AHCI)-standard.

12. A data transfer control device complying with a communication protocol which executes an update of information from an attachment device in a predetermined area of a system memory, the device comprising:
a receiving part receiving the information from the attachment device;
a transferring part transferring the information in the predetermined area, the information from the transferring part overwritten in the predetermined area sequentially; and
a determining part inhibiting a transfer of the information in the transferring part to omit the update of the information in the predetermined area,
wherein the information is a frame information structure (FIS)-information showing a preparation of a data transmitting from the attachment device, and
the determining part allows transferring the information to the system memory when the data transmitting is a final data transmitting, and inhibits transferring the information to the system memory when the data transmitting is a data transmitting except the final data transmitting.

13. The data transfer control device of claim 12, wherein the transferring the information to the system memory is executed after a completion of all data transmitting from the attachment device.

14. The data transfer control device of claim 12, wherein the determining part determines the data transmitting to be the final data transmitting, when a new FIS-information is not received by the receiving part during a predetermined term from a point in which the FIS-information is received by the receiving part.

15. The data transfer control device of claim 12, wherein the FIS-information of a data transmitting according to an error is transferred in the predetermined area of the system memory, when the error generates before a completion of the final data transmitting.

16. The data transfer control device of claim 12, wherein the information is a frame information structure (FIS)-information showing a preparation of a data receiving to the attachment device, and
the determining part allows transferring the information to the system memory, when the data receiving is a final data receiving.

17. A data transfer control device complying with a communication protocol which executes an update of information from an attachment device in a predetermined area of a system memory, the device comprising:
a receiving part receiving the information from the attachment device;
a transferring part transferring the information in the predetermined area, the information from the transferring part overwritten in the predetermined area sequentially; and
a determining part inhibiting a transfer of the information in the transferring part to omit the update of the information in the predetermined area,
wherein the information is a frame information structure (FIS)-information showing an execution of a read/write with respect to the attachment device directly, and
the transferring the information to the system memory is executed after a completion of all data read/write with respect to the attachment device, and is not executed before the completion of all data read/write with respect to the attachment device.

18. The data transfer control device of claim 17, wherein the determining part determines that the all read/write is completed, when a new FIS-information is not received by the receiving part during a predetermined term from a point in which the FIS-information is received by the receiving part.

19. The data transfer control device of claim 17, wherein the FIS-information of a read/write according to an error is transferred in the predetermined area of the system memory, when the error generates before a completion of the all read/write.

* * * * *